United States Patent
Vernia et al.

[11] 3,888,296
[45] June 10, 1975

[54] METHOD FOR THE MANUFACTURE OF A COMPOSITE ARTICLE

[75] Inventors: Peter Vernia, Rochester; James C. Holzwarth, Birmingham, both of Mich.

[73] Assignee: General Motors Corporation, Detroit, Mich.

[22] Filed: May 30, 1974

[21] Appl. No.: 474,415

[52] U.S. Cl. ............. 164/97; 164/46; 164/111
[51] Int. Cl. ............................................ B22d 19/02
[58] Field of Search .................. 164/46, 97, 111

[56] References Cited
UNITED STATES PATENTS

| | | | |
|---|---|---|---|
| 2,285,583 | 6/1942 | Jennings et al. | 164/111 X |
| 2,874,429 | 2/1959 | Emter et al. | 164/111 |
| 3,069,209 | 12/1962 | Bauer | 164/111 X |
| 3,401,736 | 9/1968 | Imagawa | 164/46 X |
| 3,455,019 | 7/1969 | Quaas | 164/97 X |
| 3,797,101 | 3/1974 | Bauer | 164/46 X |

FOREIGN PATENTS OR APPLICATIONS 873,012   7/1961   United Kingdom............... 164/111

*Primary Examiner*—R. Spencer Annear
*Attorney, Agent, or Firm*—Peter P. Kozak

[57] ABSTRACT

A composite metal article is formed by brazing a layer of ferrous metal machining chips to the surface of a ferrous metal body and then die casting an aluminum body against the brazed surface whereby the aluminum envelopes the chips and enters the interstices therebetween and whereby on solidification the aluminum body is mechanically locked to the ferrous metal body.

4 Claims, 3 Drawing Figures

PATENTED JUN 10 1975　　3,888,296

METHOD FOR THE MANUFACTURE OF A COMPOSITE ARTICLE

BACKGROUND OF THE INVENTION

This invention relates to composite ferrous metal-aluminum articles formed by die casting the aluminum body against the surface of a preformed ferrous metal body and more particularly to the provision of a ferrous metal surface which is operative to provide a strong mechanical bond between the die cast aluminum and the ferrous metal bodies.

Efforts to reduce the weight or to improve the function of various components of, for example, automobiles such as engine blocks or brake drums, require the combination of a wear resistant ferrous metal portion and a supporting aluminum body for weight reduction or improved heat conductivity purposes or both. Since such components are usually heated in use and since the coefficient of thermal expansion of iron and aluminum are markedly different, it is essential that a strong intimate bond or attachment be provided between the ferrous metal and the aluminum to prevent separation of these parts in use. A good quality bond is also essential for dimensional stability. In electrical applications a poor bond produces air gaps and hence reduced electrical conductivity so that a good bond is essential for such applications.

In the past various methods have been developed to provide a bond between the iron and aluminum parts. One class of such methods involves a metallurgical bond between the parts. In one such method the ferrous metal part is thoroughly cleaned and immersed in molten aluminum to form a ferro-aluminum alloy surface layer and then the aluminum body is cast against the ferro-aluminum layer while the latter is still wet. In a related method the formation of the ferro-aluminum layer is promoted by subjecting the ferrous metal or the molten aluminum to ultra-sonic vibration.

Another class of methods involves a mechanical bond between the parts. An example of such a method involves casting the ferrous metal portion against a mold surface having thereon a granular coke distributed in spaced relation as a single particle layer. After the ferrous metal has solidified the coke particles embedded in the casting surface are removed by said blasting to provide a surface containing a multiplicity of craters. The aluminum body is formed by die casting against the cratered surface whereby the molten aluminum is forced into the craters to form a mechanical bond between the parts.

In general the prior art methods referred to are relatively expensive to use and/or have limited applicability. For example, the mechanical bond methods referred to are not suited for bonding an aluminum casting to a rolled ferrous metal sheet stock.

SUMMARY OF THE INVENTION

The method of this invention provides a relatively inexpensive and effective composite body comprising a preformed ferrous metal portion mechanically bonded to a cast aluminum portion. The method is particularly applicable to the manufacture of articles such as an aluminum rotary engine block having its combustion cavity lined with a relatively thin steel layer mechanically bonded thereto.

In general the method comprises suitably cleaning the surface of a ferrous metal body, spreading thereover a monolayer of machining chips of a mesh size such as will pass through an 8 mesh screen and not pass through a 20 mesh screen, applying a suitable brazing powder over the said ferrous metal surface, heating the sheet in a reducing atmosphere to a brazing temperature whereby the brazing powder wets the chips and brazes the chips in place. This provides a ferrous metal sheet with a monolayer of angular particles brazed thereto with substantial reversed draft portions protruding from the ferrous metal surface. The composite article is formed preferably by die casting the aluminum against the brazed surface whereby the aluminum envelops the chip protrusions and enters the interstices therebetween and whereby on solidification the aluminum body is mechanically locked to the ferrous metal body.

BRIEF DESCRIPTION OF THE DRAWINGS

Other advantages will be apparent from the following description, reference being had to the drawings in which.

DESCRIPTION OF THE PREFERRED EMBODIMENTS

Figure 2:
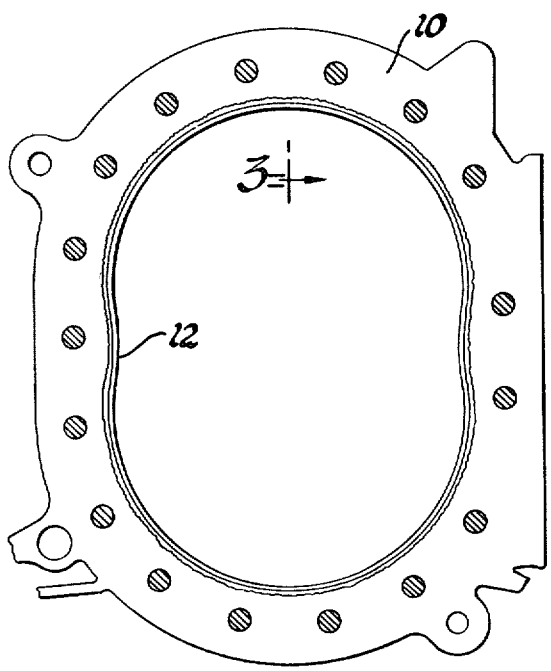
FIG. 2 is a rotary engine outer housing including the steel band of FIG. 1 as an inner liner for the trochoid cavity in accordance with the invention.

The method of this invention will now be described in terms of the making of a rotary engine housing as shown in FIG. 2. The housing comprises generally of an aluminum body portion 10 having a steel inner liner 12 forming a wear resistant working surface within which the rotor (not shown) operates in a manner well known in the art.

In accordance with the specific embodiment of the method, one planar surface of a strip of steel of suitable width is preferably cleaned by exposing the strip to perchloroethylene vapor. Next, the surface is spray coated with a Pierce and Stevens low ash lacquer. Then, while the lacquer is wet and sticky, the lacquered metal surface is passed under a falling stream of particulate machining chips for a time sufficient to cause the chips to completely cover the steel surface. The strip is then inverted so that the excess chips fall away leaving a monolayer of chips stuck on the sheet. The chips are randomly oriented and in substantially abutting relationship to one another in the monolayer.

Next, copper powder in an amount of about 0.3 grams per square inch is uniformly sprinkled over the chips. The strip is then heated in a furnace having a reducing atmosphere at a temperature of about 2050°F. In consequence the copper is melted and wets the chips and the steel surface and brazes the chips in place. The lacquer is, of course, burned away in the brazing operation without significant residue. Satisfactory results are obtained using a −100, +325 copper powder from about 0.3 to 2 grams per square inch steel surface.

Figure 1:
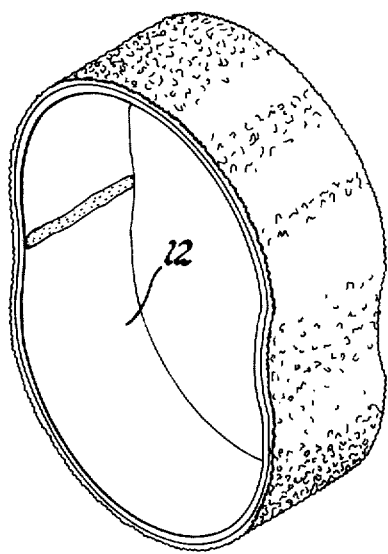
FIG. 1 is an endless steel band having a monolayer of steel chips brazed thereon.
Figure 3:
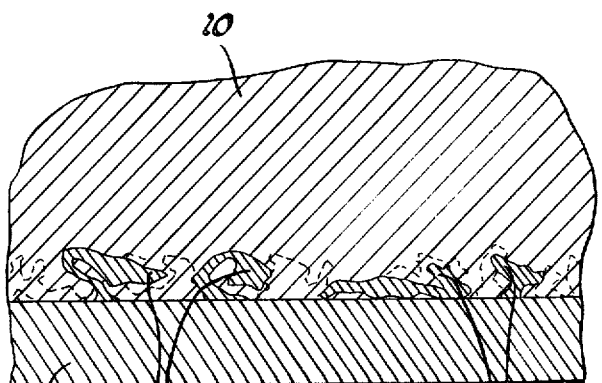
FIG. 3 is a fragmentary enlarged cross-sectional view of FIG. 2 taken along lines 3—3.

The strip is then stamped or formed into a suitable trochoid configuration and welded with the chip containing surface extending outwardly as shown in FIG. 1 of the drawings. The trochoid form is then supported on a core or mandrel within the cavity of a die casting machine having the configuration of the rotary engine housing shown in FIG. 2. Aluminum is then injected into the cavity under a pressure of preferably 5,000 to 10,000 lbs. per square inch in accordance with standard die casting technology whereby the molten metal is caused to flow about the chips and into the interstices between the chips to provide an excellent mechanical bond between the aluminum and the steel surface as shown in FIG. 3 with localized metallurgical bonding. FIG. 3 shows the curls 14 and the projections 16 projecting into the aluminum casting and providing excellent mechanical interlocking.

The inner surface of the liner serves as a base for a chromium plate or other suitable wear resistant surface. The liner may itself be subjected to hardening heat treatment so as to serve as a wear surface itself.

The machining chips used in this invention are those formed by milling or crushing or otherwise fragmenting conventional steel machining chips and preferably those which will not pass through a 20 mesh screen but will pass an 8 mesh screen. These desired chips have a greater proportion of angular entrapping shapes and a greater proportion of these entrapping shapes each project into the casting. A range of particles from about 8 to 30 mesh may be satisfactorily used in this invention.

The use of chips taken between the 8 and 30 mesh size also tends to avoid segregation of the chips in accordance with particle size so as to provide a more uniform distribution of particles and maximizing the entrapment of molten aluminum in the "curls" and entrapping shapes of the chips during the casting step. The 8 mesh screen also allows for the elimination of tramp chunks of paper, fiber, etc. and stray unmilled chips. Particles less than 30 mesh have less "curl" and projection into the casting at the same weight distribution as chips in the 8 to 20 mesh range and for this reason are not desired.

It has been found that commercial steel strip as obtained from a steel mill can be utilized in this invention without a specific cleaning step as indicated above. The above method may be varied in other ways. For example, the chips may be spread to the lacquered steel surface by means of a doctor blade or the like and randomly distributed by vibration. It is also within the scope of the invention to apply the particulate chips together with the copper powder without the use of a lacquered surface and to move the strip into the brazing furnace directly with vibration to spread the chips randomly over the steel strip surface. Instead of applying the copper in the form of a powder, a layer of copper may be electroplated onto the steel strip.

The method of this invention is generally applicable to composite bodies comprising aluminum and other metals, particularly ferrous metals. Other examples include steel lined aluminum engine blocks and aluminum brake drums having cast iron liners.

While the invention has been described in terms of certain specific embodiments, other forms may be adopted within the scope of the invention.

It is claimed:

1. Method of producing a composite metal article comprising an aluminum body having a ferrous metal layer attached thereto comprising the steps of:

applying a mono particle layer of ferrous metal machining chips on the surface of a ferrous metal layer;

brazing said chips to said ferrous metal layer;

die casting said aluminum body onto said chips whereby the molten metal enters the interstices of said chips and on solidification the aluminum body is mechanically attached to said ferrous layer.

2. Method of making a composite metal article comprising an aluminum portion and a ferrous metal portion comprising the steps of:

applying a mono particle layer to ferrous metal machining chips of a size of about −8, +20 mesh on a ferrous metal surface with said chips being randomly and substantially uniformly distributed and covering major proportions of said surface;

brazing said chips to said ferrous metal layer; and die casting an aluminum body onto said chips whereby the molten aluminum enters the interstices of said chips and on solidification the aluminum body is mechanically attached to said ferrous layer.

3. Method of making a composite metal article comprising an aluminum portion and a ferrous metal portion comprising the steps of:

applying a mono particle layer of ferrous metal machining chips of a size of about −8, +20 mesh on the surface of a ferrous metal layer with said chips being applied in amounts of about 1 to 2 grams per square inch of said ferrous metal layer, randomly and substantially uniformly distributed over said metal layer;

brazing said chips to said metal layer; and die casting an aluminum body onto said chips whereby the molten aluminum enters the interstices of said chips and on solidification the aluminum body is mechanically attached to said ferrous layer.

4. Method of making a composite metal article comprising an aluminum portion and a ferrous metal portion comprising the steps of:

applying a mono particle layer of ferrous metal machining chips of a size of about −8, +20 mesh on the surface of a ferrous metal layer with said chips being applied in amounts of about 1 to 2 grams per square inch of said ferrous metal layer, randomly and substantially uniformly distributed over said metal layer;

sprinkling a copper powder of a size of −100, +325 mesh over said mono particle layer in amounts of about 0.3 grams per square inch of said ferrous metal layer surface;

heating said ferrous metal surface in a reducing atmosphere to the brazing temperature of said copper powder whereby the molten copper wets and brazes the ferrous chips in place;

die casting an aluminum body onto said chips whereby the molten aluminum enters the interstices of said chips and on solidification the aluminum body is mechanically attached to said ferrous layer.

* * * * *